Patented Aug. 29, 1944

2,356,803

UNITED STATES PATENT OFFICE 2,356,803

GONAD-STIMULATING HORMONES AND METHODS OF OBTAINING AND SEPARATING THEM

Harry B. van Dyke and Roy O. Greep, Stelton, and Bacon F. Chow, Highland Park, N. J., assignors to E. R. Squibb & Sons, New York, N. Y., a corporation of New York No Drawing. Application March 5, 1940, Serial No. 322,340

5 Claims. (Cl. 167—74)

This invention relates to, and has for its object the provision of: I, substantially pure interstitial-cell-stimulating hormone; II, substantially pure gametogenic hormone; III, a method of obtaining the gonad-stimulating hormones from the pituitary gland; and IV, a method of separating the interstitial-cell-stimulating and gametogenic hormones from each other and isolating them in substantially pure condition.

The term "interstitial-cell-stimulating hormone" is used in this application to designate the hormone of the pituitary gland which stimulates the interstitial cells of the testis and ovary, and commonly called "luteinizing hormone"; the term "gametogenic hormone" is used to designate the hormone of the pituitary gland which maintains and supports the growth of the germinal epithelium of the testis and the follicular cells of the ovary, and commonly called "follicle-stimulating hormone"; and the term "gonad-stimulating hormones" is used to designate the hormone mixture essentially comprising the interstitial-cell-stimulating and gametogenic hormones of the pituitary gland.

The prior methods of obtaining the gonad-stimulating hormones and separating the mixture into its component hormones (e. g., the method disclosed in U. S. Patent 2,030,209) have been unsatisfactory, particularly from the standpoint of efficiency and completeness of separation. It has been found that the interstitial-cell-stimulating hormone and the gametogenic hormone are mutually distinct, biologically, physically, and chemically, a fact not clearly shown by prior investigators. By making use of this fact, there has been developed a method of separating these hormones from each other in a single operation without serious loss and obtaining each of the hormones more than 99% pure in terms of the other (i. e., containing less than 1% of the other), as indicated by biological assays in hypophysectomized immature rats and by physicochemical determinations, e. g., of solubility characteristics.

The practice of this invention essentially comprises extracting the gonad-stimulating hormones from an undenatured source thereof (preferably fresh undried pituitary glands), purifying the hormone mixture, and separating it into its component interstitial-cell-stimulating and gametogenic hormones by treating an aqueous solution of the gonad-stimulating hormones with an appropriate quantity of acetate buffer to produce an about ¼-molar solution of the buffer (or equivalent pH regulator), and with an appropriate quantity of salting-out salt to precipitate the interstitial-cell-stimulating hormone, the gametogenic hormone remaining in solution. By "salting-out salt" is meant, of course, a highly-soluble salt capable of precipitating proteins from aqueous solutions thereof; which salts comprise, inter alia, sodium acetate, magnesium sulfate, potassium citrate, potassium acid phthalate, sodium chloride, and, notably, sodium sulfate and ammonium sulfate.

The gonad-stimulating hormones are preferably obtained as follows: Comminuted fresh animal-pituitary glands are extracted at a low temperature with a dilute aqueous solution of sodium chloride, the pH is adjusted to about 4.2–4.6, the precipitated protein removed, and the hormones in the filtrate precipitated by substantially saturating it with a salting-out salt; the hormone-containing precipitate is dialyzed (the salting-out salt being removed and the active fraction of the precipitate going into solution), and substances insoluble in water and dilute acid (pH about 5) are discarded; the solution is then made about ⅓ saturated with a salting-out salt, preferably ammonium sulfate, the precipitate removed, and the solution then made substantially saturated with salting-out salt to precipitate the desired gonad-stimulating hormones.

The following example is illustrative of the invention:

8.7 kg. fresh (frozen) hog-pituitary glands are ground and suspended in 44 liters of a 2% aqueous solution of sodium chloride and extracted at a temperature slightly above freezing. After vigorously stirring for about 2 hours, the suspension is allowed to stand in a cold place for 12–16 hours. The pH of diluted aliquot samples is adjusted by means of N/70 HCl to the point of maximum precipitation as shown by the tube containing the minimum concentration of nitrogen in the supernatant; and the calculated amount of N/1 HCl is added to the large batch and its pH is lowered to within 0.05 of that of maximum precipitation, usually lying in the range 4.2–4.6. The mixture is finally centrifuged and the supernatant is collected in a large vessel; the precipitate is washed twice with a cold 2% NaCl solution, about 15 liters being used for each washing; the supernatant and washings are then combined and to each liter of fluid is added 660 grams of solid ammonium sulfate; and the suspension is permitted to stand at room temperature for 12–16 hours and is filtered on fluted paper. The precipitate is then dialyzed in a refrigerator against distilled water (ammonium sulfate being removed and the active fraction of the precipitate going into solution); when free from ammonium sulfate, the solution is centrifuged to remove the black sediment, which is relatively rich in chromatosome-dispersing hormone. To the supernatant and the washings of the black material is added N/1 NaOH to precipitate some inert protein (the amount of alkali necessary to effect maximum precipitation being first determined in small aliquot samples in the manner described above), the pH at which the maximum precipitation occurs being approximately 5.10. After centrifuging and washing the inactive precipitate with water, the combined supernatants, which contain most of the activity, are made ⅓-saturated with ammonium sulfate; and the precipitate insoluble at this saturation is centrifuged after standing at room temperature for 12–16 hours, and washed twice with ⅓ saturated ammonium sulfate solution. This precipitate also is inactive. The pH of the combined supernatant and washings is lowered to about 4.2 by means of N/1 $H_2SO_4$ in ⅓-saturated ammonium sulfate solution. A portion of the inert protein precipitates. After standing at room temperature for about two hours, the precipitate is removed by centrifuging. The precipitate is washed twice with ⅓-saturated ammonium sulfate solution, and the combined supernatant and washings are then brought to full saturation with ammonium sulfate; and the precipitate is filtered and dialyzed, and the filtrate discarded. When the dialyzed solution (the solution of the precipitate resulting on removal of ammonium sulfate) is free from sulfate, it is so diluted that the final solution contains about 4.0 mg. of protein N per cc. To this protein solution is added an equal volume of saturated ammonium sulfate solution, and the pH of the mixture is again brought to about 4.2, at which a voluminous precipitation of inactive protein occurs. After standing at room temperature for about two hours, the inert precipitate is removed by centrifuging and washed with half-saturated ammonium sulfate solution. The combined solution is made 0.9-saturated with ammonium sulfate by the addition of the solid salt, and the precipitated protein is then filtered and dialyzed until free from sulfate.

The salt-free solution thus obtained contains almost the entire amount of the gonad-stimulating hormones present in the pituitary glands. The separation of the component interstitial-cell-stimulating and gametogenic hormones is achieved by the following procedure. To the protein solution is added an equal volume of 1.0 M acetate buffer of pH 4.43, and then two volumes of 41% sodium sulfate. The precipitated protein is almost pure interstitial-cell-stimulating hormone, and may be further purified to a high degree by repeating the process of precipitation (three or four times) until the dissolved protein nitrogen is constant (0.025 mg. per cc.). The soluble protein fraction is saturated with solid ammonium sulfate, and the precipitated protein is filtered with suction and dissolved in a minimum amount of water and dialyzed. Any remaining trace of interstitial-cell-stimulating hormone can be removed by repeatedly precipitating it from the solution of the gametogenic hormone with acetate buffer and sodium sulfate mixture (until a concentrated aqueous solution of the gametogenic hormone is completely free from turbidity when 1 volume of acetate buffer and 2 volumes of $Na_2SO_4$ solution are added).

The protein thus obtained is the substantially pure gametogenic hormone, giving a purely follicle-stimulating effect.

The interstitial-cell-stimulating hormone is assayed in hypophysectomized immature male and female rats. In both sexes it stimulates the interstitial cells; and in males it causes testicular hypertrophy and enlargement of the anterior lobe of the prostate. A dose having a detectable gonadotropic effect in immature hypophysectomized rats is equivalent to 0.002 mg. of nitrogen or less.

The gametogenic hormone is assayed in hypophysectomized immature male and female rats. In both sexes it stimulates the germinal epithelium only; and it causes enlargement of the tubules in males and follicular growth in females. It causes neither enlargement of the anterior prostate in males (absence of interstitial-cell stimulation) nor interstitial-cell stimulation, histologically, in either ovaries or testes. A dose having a detectable gonadotropic effect in immature hypophysectomized rats is equivalent to 0.002 mg. of nitrogen or less.

A dose of 0.360 mg. (equivalent to at least 180 times the minimal effective dose) of interstitial-cell-stimulating hormone causes no detectable follicle-stimulating effect. A dose of 0.360 mg. (equivalent to at least 180 times the minimal effective dose) of gametogenic hormone causes no detectable interstitial-cell-stimulating effect.

Interstitial-cell-stimulating hormone as a saturated solution in an aqueous 0.25 M acetate buffer solution having a pH of 4.43, and containing 20.5% sodium sulfate, has a constant solubility equivalent to about 0.025 mg. of nitrogen per cc. The gametogenic hormone as a saturated solution in an aqueous 0.15 M acetate buffer solution having a pH of 4.43, and 0.6 saturated with ammonium sulfate, has a constant solubility equivalent to about 0.04 mg. nitrogen per cc. By "constant solubility" is meant, of course, a solubility which does not vary with increase of the quantity of the solid phase to many times that required to saturate the solvent.

The interstitial-cell-stimulating and gametogenic hormones are valuble therapeutic agents for the promotion of their respective specific physiological effects in medical situations requiring them. Thus, in any disease due to or complicated by deficiency of secretion of the interstitial cells of the testes or the similar cells of the ovaries together with the related lutein cells, the interstitial-cell-stimulating hormone would be expected to correct the deficiency; and this hormone might also maintain spermatogenesis in the male by facilitating the formation of androgen. The gametogenic hormone should act as a stimulus to the formation of germ cells when such formation is subject to interference owing to deficient pituitary secretion or other causes.

The invention may be variously otherwise embodied within the scope of the appended claims.

We claim:

1. The method of obtaining the gonad-stimulating hormones from the pituitary gland which comprises extracting fresh animal pituitary glands at a low temperature with a dilute aqueous solution of sodium chloride, adjusting the pH of the extract to about 4.2–4.6, removing the precipitated inert protein, substantially saturating the solution with a salting-out salt, dialyzing the precipitate against water, removing insoluble material from the resulting aqueous solution of the active fraction of the precipitate, adjusting the solution to a dilute-acid pH and removing the resulting precipitate, making the resulting solution about ⅓-saturated with a salting-out salt, removing the precipitate, and making the solution substantially saturated with salting-out salt to precipitate the gonad-stimulating hormones.

2. The method of isolating the interstitial-cell-stimulating and gametogenic hormones of the anterior lobe of the pituitary gland which comprises treating an aqueous solution of these gonad-stimulating hormones with an appropriate quantity of acetate buffer to produce an about ¼ molar solution of the buffer and with an appropriate quantity of a salting-out salt to make an about 20% solution of the salt, separating the precipitated interstitial-cell-stimulating hormone, and precipitating the gametogenic hormone from the solution by making the solution substantially saturated with salting-out salt.

3. The method of isolating substantially pure gametogenic hormone which comprises treating an aqueous solution of the gonad-stimulating hormones of the pituitary gland with an appropriate quantity of acetate buffer to produce an about ¼-molar solution of the buffer and with an appropriate quantity of a salting-out salt to make an about 20% solution of the salt, separating the precipitated interstitial cell-stimulating hormone, precipitating the gametogenic hormone from the solution by making the solution substantially saturated with salting-out salt, dialyzing the precipitate, and repeating the precipitating step for interstitial-cell-stimulating hormone on a solution of the gametogenic hormone until the gametogenic hormone has a constant solubility.

4. The method of obtaining interstitial-cell-stimulating and gametogenic hormones which comprises extracting gonad-stimulating hormones from pituitary glands, purifying the hormones, and separating the gonad-stimulating hormones into its component hormones by treating an aqueous solution of the gonad-stimulating hormones with an appropriate quantity of acetate buffer to produce an about ¼-molar solution of the buffer and with an appropriate quantity of a salting-out salt to make an about 20% solution of the salt, separating the precipitated interstitial-cell-stimulating hormone, and recovering the gametogenic hormone from the solution.

5. A product obtained by treating an aqueous solution of the gonad-stimulating hormones of the pituitary gland with an appropriate quantity of acetate buffer to produce an about 0.25-molar solution of the buffer and with an appropriate quantity of a salting-out salt to make an about 20% solution of the salt; separating the precipitated interstitial-cell-stimulating hormone, precipitating the gametogenic hormone from the solution by making the solution substantially saturated with salting-out salt, dialyzing the precipitate, and repeating the precipitating step for interstitial-cell-stimulating hormone on a solution of the gametogenic hormone until the gametogenic hormone has a constant solubility.

HARRY B. VAN DYKE.
ROY O. GREEP.
BACON F. CHOW.